US007267895B2

(12) United States Patent
Shoudai et al.

(10) Patent No.: US 7,267,895 B2

(45) Date of Patent: Sep. 11, 2007

(54) MAGNETIC TAPE AND METHOD FOR MANUFACTURING THE SAME

(75) Inventors: Sadayuki Shoudai, Tokyo (JP); Tsutomu Kikuchi, Tokyo (JP)

(73) Assignee: TDK Corporation, Tokyo (JP)

( * ) Notice: Subject to any disclaimer, the term of this patent is extended or adjusted under 35 U.S.C. 154(b) by 217 days.

(21) Appl. No.: 10/790,313

(22) Filed: Mar. 1, 2004

(65) Prior Publication Data

US 2004/0173069 A1 Sep. 9, 2004

(30) Foreign Application Priority Data

Mar. 6, 2003 (JP) ............................ 2003-059494

(51) Int. Cl.

*G11B 5/66* (2006.01)
*G11B 5/78* (2006.01)
*B26D 5/20* (2006.01)

(52) U.S. Cl. .......................... 428/838; 428/845; 83/56; 360/134

(58) Field of Classification Search ................ 428/800, 428/826, 831.2, 838, 848.8, 900, 847, 845, 428/846; 83/56, 345, 500, 675, 676, 496, 83/497, 4; 360/134

See application file for complete search history.

(56) References Cited

U.S. PATENT DOCUMENTS 5,423,239 A * 6/1995 Sakai et al. ..................... 83/56
5,827,599 A * 10/1998 Murao et al. ............... 428/838
6,103,340 A * 8/2000 Kubo et al. ................. 428/845
6,627,334 B2 * 9/2003 Iida et al. ................... 428/847
7,045,228 B2 * 5/2006 Kanazawa et al. .......... 428/846

FOREIGN PATENT DOCUMENTS

JP 09-153212 6/1997
JP 11-296839 10/1999

OTHER PUBLICATIONS

JA 11-296839 machine translation.*
JA 09-153212 machine translation.*

* cited by examiner

*Primary Examiner*—Carol Chaney
*Assistant Examiner*—Louis de Falasco
(74) *Attorney, Agent, or Firm*—Seed IP Law Group PLLC

(57) ABSTRACT

A method for manufacturing a magnetic tape includes the steps of feeding a broad magnetic tape including a broad support formed with a magnetic recording layer on one side thereof and a back coat layer on the other surface thereof to a portion between a disk-like upper blade and a disk-like lower blade overlapping each other and rotating in opposite directions and cutting the broad magnetic tape into magnetic tapes each having a predetermined width, which method for manufacturing a magnetic tape further includes a step of setting a cutting start angle between the disk-like upper blade and the disk-like lower blade overlapping each other and rotating in opposite directions at the time that cutting of the broad magnetic tape fed to a portion between the upper blade and the lower blade by the upper blade and the lower blade is started so that a lower blade side cut surface of the magnetic tape to be formed by cutting the broad magnetic tape includes 40% to 65% of a region formed by cutting the magnetic tape by a breaking force, thereby cutting the broad magnetic tape.

According to the above method, it is possible to manufacture a magnetic tape which can minimize an irregular raised and depressed pattern of a cut surface of a magnetic tape.

17 Claims, 5 Drawing Sheets

MAGNETIC TAPE AND METHOD FOR MANUFACTURING THE SAME

BACKGROUND OF THE INVENTION

The present invention relates to a magnetic tape and a method for manufacturing a magnetic tape and, particularly, to a magnetic tape and a method for manufacturing a magnetic tape which can minimize an irregular raised and depressed pattern of a cut surface of a magnetic tape obtained by feeding a broad magnetic tape to a portion between a disk-like upper blade and a disk-like lower blade overlapping each other and rotating in the opposite directions and cutting it along the longitudinal direction thereof, and effectively prevent a part of the cut surface of the magnetic tape from peeling off and dropping from the cut surface of the magnetic tape when data are to be recorded in the magnetic tape or data are to be reproduced from the magnetic tape due to the irregular raised and depressed pattern of the cut surface of the magnetic tape.

DESCRIPTION OF THE PRIOR ART

Usually, a magnetic tape is manufactured by forming a magnetic recording layer on one surface of a broad support, forming a back coat layer on the other surface thereof to form a broad magnetic tape, and feeding the broad magnetic tape to a portion between a rotating upper blade and lower blade of a cutting device, thereby cutting the broad magnetic tape into magnetic tapes having a width equal to that of a product.

However, it is known that in the case where a magnetic tape is manufactured by feeding a broad magnetic tape to a portion between a disk-like upper blade and a disk-like lower blade overlapping each other and rotating in the opposite directions and cutting it into magnetic tapes having a width equal to that of a product, an irregular raised and depressed pattern tends to be generated on the cut surface of the magnetic tape. In the case where the irregular raised and depressed pattern is generated on the cut surface of the magnetic tape, the cut surface of the magnetic tape, which is used as a guide surface, is guided by guide members of a data recording apparatus when data are to be recorded in the magnetic tape, and the cut surface of the magnetic tape is guided by guide members of a data reproducing apparatus when data are to be reproduced from the magnetic tape. Therefore, there is some risk of a part of the cut surface peeling off and dropping from the cut surface of the magnetic tape.

In order to prevent such trouble from occurring and to manufacture a magnetic tape by cutting a broad magnetic tape so as to diminish the irregular raised and depressed pattern generated on the cut surface thereof, it has been proposed to adjust the degree of overlap between a disk-like upper blade and a disk-like lower blade for cutting the broad magnetic tape or chamfer the upper blade or the lower blade.

According to these methods, it is possible to diminish the irregular raised and depressed pattern of the cut surface of a magnetic tape to some extent. However, since the degree of overlap between the disk-like upper blade and the disk-like lower blade to be set in order to improve the irregular raised and depressed pattern of the cut surface of a magnetic tape depends upon the diameters of the disk-like upper blade and the disk-like lower blade, it is indispensable to experimentally determine the degree of overlap between the disk-like upper blade and the disk-like lower blade in accordance with the diameters of the disk-like upper blade and the disk-like lower blade. It is impossible to sufficiently diminish the irregular raised and depressed pattern of the cut surface of a magnetic tape only by chamfering the upper blade or the lower blade. Therefore, it is required to develop a method for diminishing the irregular raised and depressed pattern of the cut surface of a magnetic tape in a desired manner.

SUMMARY OF THE INVENTION

It is therefore an object of the present invention to provide a magnetic tape and a method for manufacturing a magnetic tape which can suppress an irregular raised and depressed pattern of a cut surface of a magnetic tape to the minimum, which is obtained by feeding a broad magnetic tape to a portion between a disk-like upper blade and a disk-like lower blade overlapping each other and rotating in the opposite directions and cutting it along the longitudinal direction thereof and effectively prevent a part of the cut surface of the magnetic tape from peeling off and dropping from the cut surface of the magnetic tape when data are to be recorded in the magnetic tape or data are to be reproduced from the magnetic tape due to the irregular raised and depressed pattern of the cut surface of the magnetic tape.

The inventors of the present invention vigorously pursued a study for accomplishing the above objects and, as a result, made the discovery that in the case where a broad magnetic tape was cut at a portion between a disk-like upper blade and a disk-like lower blade overlapping each other and rotating in opposite directions and cut by the upper blade and the lower blade along the longitudinal direction thereof to manufacture a magnetic tape, the cut surface of the magnetic tape included sheared regions formed by cutting the broad magnetic tape by a shearing force and located close to both side surfaces thereof and a broken region formed by cutting the broad magnetic tape by a breaking force and located between the sheared regions and that an irregular raised and depressed pattern formed in the broken region was small, while an irregular raised and depressed pattern formed in each of the sheared regions was large. In a further study of the inventors of the present invention, it was found that an irregular raised and depressed pattern of the cut surface of the magnetic tape became small as the ratio of the broken region included in the cut surface of the magnetic tape increased and even if guide members of a data recording apparatus or a data reproducing apparatus came into contact with the cut surface of the magnetic tape on the side of the lower blade, it was possible to prevent a part of the cut surface from peeling and dropping off the cut surface of the magnetic tape. However, the inventors of the present invention further found that in the case where the ratio of the broken region included in the cut surface of the magnetic tape on the side of the lower blade exceeded 65%, a large irregular raised and depressed pattern was formed in the cut surface of the magnetic tape on the side of the upper blade and when the magnetic tape was guided by the guide members of the data recording apparatus or the date reproducing apparatus, the guide members came into contact with the cut surface of the magnetic tape on the side of the upper blade and there arose a risk of a part of the cut surface of the magnetic tape on the side of the upper blade peeling and dropping off the cut surface of the magnetic tape. As a result, the inventors of the present invention found that the above and other objects of the present invention could be accomplished by a magnetic tape which is manufactured by feeding a broad magnetic tape including a broad support formed with a magnetic recording layer on one side thereof and a back coat layer on the other surface thereof to a portion between a disk-like upper blade and a disk-like lower blade overlapping each other and rotating in opposite directions to each other and cutting it into magnetic tapes each having a predetermined width and whose cut surface on the side of the lower blade includes 40% to 65% of a region formed by cutting the magnetic tape by a breaking force.

In a study of the inventors of the present invention, it was found that in the case where the ratio of the broken region included in the lower blade side cut surface of the magnetic tape manufactured by cutting the broad magnetic tape using the disk-like upper blade and the disk-like lower blade overlapping each other and rotating in opposite directions was less than 40%, a large irregular raised and depressed pattern was formed in the cut surface of the magnetic tape on the side of the lower blade and there arose a risk of guide members of a data recording apparatus for guiding the magnetic tape coming into contact with the cut surface of the magnetic tape on the side of the lower blade when data were to be recorded in the magnetic tape or a risk of guide members of a data reproducing apparatus for guiding the magnetic tape coming into contact with the cut surface of the magnetic tape on the side of the lower blade when data were to be reproduced from the magnetic tape, thereby causing a part of the cut surface of the magnetic tape to peel and drop off the cut surface of the magnetic tape.

In a further study done by the inventors of the present invention, it was found that in the case where the ratio of the broken region included in the lower blade side cut surface of the magnetic tape manufactured by cutting the broad magnetic tape using the disk-like upper blade and the disk-like lower blade overlapping each other and rotating in opposite directions exceeded 65%, a large irregular raised and depressed pattern was formed in the cut surface of the magnetic tape on the side of the upper blade and there arose a risk of guide members of a data recording apparatus or a data reproducing apparatus coming into contact with the cut surface of the magnetic tape on the side of the upper blade when the magnetic tape was guided by the guide members thereby causing a part of the cut surface of the magnetic tape to peel and drop off the cut surface of the magnetic tape.

To the contrary, the inventors of the present invention further found that in the case where the ratio of the broken region included in the lower blade side cut surface of the magnetic tape was 40% to 65%, it was possible to suppress the irregular raised and depressed pattern of the cut surface of the magnetic tape on the side of the lower blade and the irregular raised and depressed pattern of the cut surface of the magnetic tape on the side of the upper blade to within an acceptable range and therefore, if a cutting start angle between the disk-like upper blade and the disk-like lower blade overlapping each other and rotating in opposite directions at the time that cutting of the broad magnetic tape fed to a portion therebetween was started was set so that the lower blade side cut surface of the magnetic tape to be manufactured by cutting the broad magnetic tape using the disk-like upper blade and the disk-like lower blade included 40% to 65% of the broken region and the broad magnetic tape was cut, thereby manufacturing the magnetic tape, then even if guide members of a data recording apparatus or a data reproducing apparatus came into contact with the cut surface of the magnetic tape on the side of the lower blade or the upper blade, it was possible to prevent a part of the cut surface of the magnetic tape from peeling and dropping off the cut surface of the magnetic tape.

In this specification, a "cut surface of a magnetic tape on the side of an upper blade" means a cut surface of the magnetic tape in contact with the upper blade after a broad magnetic tape is cut and a "cut surface of a magnetic tape on the side of a lower blade" means a cut surface of the magnetic tape in contact with the lower blade after a broad magnetic tape is cut.

Therefore, the above and other objects of the present invention can be accomplished by a magnetic tape manufactured by feeding a broad magnetic tape including a broad support formed with a magnetic recording layer on one side thereof and a back coat layer on the other surface thereof to a portion between a disk-like upper blade and a disk-like lower blade overlapping each other and rotating in opposite directions to each other and cutting it into magnetic tapes each having a predetermined width, a cut surface of the magnetic tape on the side of the lower blade including 40% to 65% of a region formed by cutting the magnetic tape by a breaking force.

In a further study done by the inventors of the present invention, it was found that, irrespective of the diameter of the upper blade, the diameter of the lower blade and the length of a region where the upper blade and the lower blade overlapped, the ratio of the broken region included in the cut surface of the magnetic tape on the side of the lower blade depended upon the cutting start angle between the disk-like upper blade and the disk-like lower blade overlapping each other and rotating in opposite directions at the time that cutting of the broad magnetic tape fed to a portion between the upper blade and the lower blade by the upper blade and the lower blade was started. The above and other objects of the present invention can therefore be also accomplished by a method for manufacturing a magnetic tape comprising steps of feeding a broad magnetic tape including a broad support formed with a magnetic recording layer on one side thereof and a back coat layer on the other surface thereof to a portion between a disk-like upper blade and a disk-like lower blade overlapping each other and rotating in opposite directions and cutting the broad magnetic tape into magnetic tapes each having a predetermined width, which method for manufacturing a magnetic tape further comprises a step of setting a cutting start angle between the disk-like upper blade and the disk-like lower blade overlapping each other and rotating in opposite directions at the time that cutting of the broad magnetic tape fed to a portion between the upper blade and the lower blade by the upper blade and the lower blade is started so that a lower blade side cut surface of the magnetic tape to be formed by cutting the broad magnetic tape by the upper blade and the lower blade includes 40% to 65% of a region formed by cutting the magnetic tape by a breaking force, thereby cutting the broad magnetic tape.

In a preferred aspect of the present invention, the cutting start angle between the disk-like upper blade and the disk-like lower blade overlapping each other and rotating in opposite directions at the time that cutting of the broad magnetic tape fed to a portion between the upper blade and the lower blade by the upper blade and the lower blade is started is set so that the lower blade side cut surface of the magnetic tape to be formed by cutting the broad magnetic tape by the upper blade and the lower blade includes 50% to 60% of a region formed by cutting the magnetic tape by a breaking force, thereby cutting the broad magnetic tape.

In a further study done by the inventors of the present invention, it was found that in the case where the ratio of the broken region included in the lower blade side cut surface of the magnetic tape to be formed by cutting the broad magnetic tape by the upper blade and the lower blade was 50% to 60%, both the irregular raised and depressed pattern of the magnetic tape on the side of the lower blade and the irregular raised and depressed pattern of the magnetic tape on the side of the upper blade became smaller. Therefore, since in this preferred aspect of the present invention the cutting start angle between the disk-like upper blade and the disk-like lower blade overlapping each other and rotating in opposite directions at the time that cutting of the broad magnetic tape fed to a portion between the upper blade and the lower blade by the upper blade and the lower blade is started is set so that the lower blade side cut surface of the magnetic tape to be formed by cutting the broad magnetic tape by the upper blade and the lower blade includes 50% to 60% of a region formed by cutting the magnetic tape by a breaking force, thereby cutting the broad magnetic tape, it follows that even if guide members of a data recording apparatus or a data reproducing apparatus come into contact with the cutting surface of the magnetic tape on the side of the lower blade or the upper blade, it is possible to reliably prevent a part of the cut surface of the magnetic tape from peeling and dropping off the cut surface.

In a preferred aspect of the present invention, the cutting start angle between the disk-like upper blade and the disk-like lower blade overlapping each other and rotating in opposite directions at the time that cutting of the broad magnetic tape fed to a portion therebetween is started is set to be equal to or less than 12 degrees and the broad magnetic tape is cut, thereby manufacturing the magnetic tape.

As pointed out above, in one study done by the inventors of the present invention, it was found that in the case where the ratio of the broken region included in the lower blade side cut surface of the magnetic tape formed by cutting the broad magnetic tape by the upper blade and the lower blade overlapping each other and rotating in opposite directions was 50% to 60%, both the irregular raised and depressed pattern of the magnetic tape on the side of the lower blade and the irregular raised and depressed pattern of the magnetic tape on the side of the upper blade were small, and even if guide members of a data recording apparatus or a data reproducing apparatus came into contact with the cutting surface of the magnetic tape on the side of the lower blade or the upper blade, it was possible to effectively prevent a part of the cut surface of the magnetic tape from peeling and dropping off the cut surface. However, the inventors of the present invention further found that in the case where the cutting start angle between the upper blade and the lower blade exceeded 12 degrees, the irregular raised and depressed pattern formed on the cut surface of the magnetic tape on the side of the upper blade became larger and when the guide members of a data recording apparatus or a data reproducing apparatus came into contact with the cutting surface of the magnetic tape on the side of the upper blade, there arose a risk of a part of the cut surface of the magnetic tape peeling and dropping off the cut surface.

Therefore, since in this preferred aspect of the present invention the cutting start angle between the disk-like upper blade and the disk-like lower blade overlapping each other and rotating in opposite directions at the time that cutting of the broad magnetic tape fed to a portion therebetween is started is set to be equal to or less than 12 degrees, so that a lower blade side cut surface of the magnetic tape to be formed by cutting the broad magnetic tape by the upper blade and the lower blade includes 40% to 65% of a region formed by cutting the magnetic tape by a breaking force and the broad magnetic tape is cut by the upper blade and the lower blade, thereby manufacturing a magnetic tape, it follows that even if guide members of a data recording apparatus or a data reproducing apparatus come into contact with the cutting surfaces of the magnetic tape on both sides of the upper blade and the lower blade, it is possible to effectively prevent a part of the cut surface of the side of the upper blade and a part of the cut surface of the magnetic tape on the side of the lower blade from peeling and dropping off the cut surfaces.

In a further preferred aspect of the present invention, the cutting start angle between the disk-like upper blade and the disk-like lower blade overlapping each other and rotating in opposite directions at the time that cutting of the broad magnetic tape fed to a portion therebetween is started is set to be equal to or larger than 9 degrees and less than 12 degrees and the broad magnetic tape is cut, thereby manufacturing the magnetic tape.

As pointed out above, in one study done by the inventors of the present invention, it was found that in the case where the ratio of the broken region included in the lower blade side cut surface of the magnetic tape formed by cutting the broad magnetic tape by the upper blade and the lower blade overlapping each other and rotating in opposite directions was 50% to 60%, both the irregular raised and depressed pattern of the magnetic tape on the side of the lower blade and the irregular raised and depressed pattern of the magnetic tape on the side of the upper blade were small, and even if guide members of a data recording apparatus or a data reproducing apparatus came into contact with the cutting surface of the magnetic tape on the side of the lower blade or the upper blade, it was possible to effectively prevent a part of the cut surface of the magnetic tape from peeling and dropping off the cut surface, but on the other hand, the irregular raised and depressed pattern of the magnetic tape of the side of the upper blade became large as the ratio of the broken region included in the cut surface of the magnetic tape on the side of the lower blade became large. However, the inventors of the present invention further found that in the case where the cutting start angle between the disk-like upper blade and the disk-like lower blade was set to be equal to or larger than 9 degrees and less than 12 degrees and a broad magnetic tape was cut to manufacture a magnetic tape, no projection which tended to drop off the cut surface when guide members of a data recording apparatus or a data reproducing apparatus came into contact therewith was formed on the cut surface of the magnetic tape on the side of the upper blade.

Therefore, since in this preferred aspect of the present invention the cutting start angle between the disk-like upper blade and the disk-like lower blade overlapping each other and rotating in opposite directions at the time that cutting of the broad magnetic tape fed to a portion therebetween is started is set to be equal to or larger than 9 degrees and less than 12 degrees so that a lower blade side cut surface of the magnetic tape to be formed by cutting the broad magnetic tape by the upper blade and the lower blade includes 40% to 65% of a region formed by cutting the magnetic tape by a breaking force and the broad magnetic tape is cut by the upper blade and the lower blade, thereby manufacturing a magnetic tape, it follows that even if guide members of a data recording apparatus or a data reproducing apparatus come into contact with the cutting surfaces of the magnetic tape on both sides of the upper blade and the lower blade, it is possible to reliably prevent a part of the cut surface of the side of the upper blade and a part of the cut surface of the magnetic tape on the side of the lower blade from peeling and dropping off the cut surfaces.

In a preferred aspect of the present invention, an upper blade whose surface facing the lower blade is substantially parallel with a surface of the lower blade facing the upper blade is employed as the upper blade.

In the present invention, the kind of a magnetic recording tape is not particularly limited and illustrative examples include a computer data back-up tape, a magnetic tape for audio recording, a magnetic tape for video recording, an 8 mm magnetic tape for video recording and the like. The magnetic tape may include a single magnetic recording layer or a plurality of magnetic recording layers.

In the present invention, the magnetic tape includes a support, one or more magnetic recording layers formed on one surface of the support and a back coat layer formed on the other surface of the support. However, the magnetic tape may further include an undercoat layer between the magnetic recording layer and the support for improving adhesiveness between the magnetic recording layer and the support.

In a preferred aspect of the present invention, the magnetic tape is constituted as a computer data back-up tape.

The above and other objects and features of the present invention will become apparent from the following description made with reference to the accompanying drawings.

DESCRIPTION OF THE PREFERRED EMBODIMENTS

Figure 1:
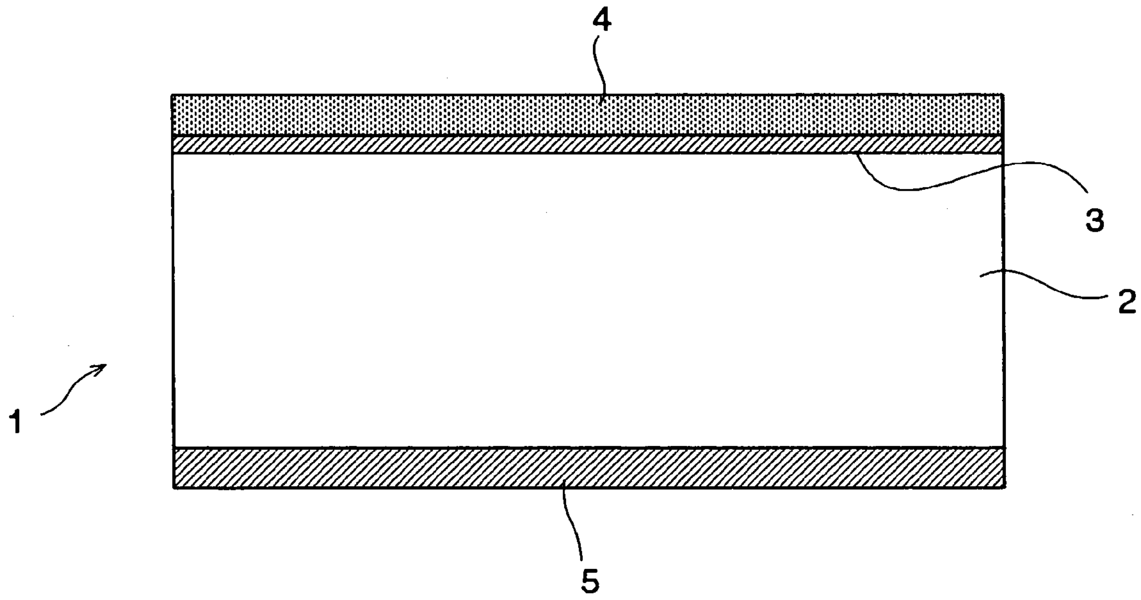
FIG. 1 is a schematic cross-sectional view showing a magnetic tape manufactured by ideally cutting a broad magnetic tape in the longitudinal direction thereof.

FIG. 1 is a schematic cross-sectional view showing a magnetic tape manufactured by ideally cutting a broad magnetic tape in the longitudinal direction thereof A magnetic tape 1 is constituted as a computer data back-up tape 1. As shown in FIG. 1, the computer data back-up tape 1 includes a support 2, and an undercoat layer 3 and a magnetic recording layer 4 for recording data therein are formed on one surface of the support 2 and a back coat layer 5 is formed on the other surface of the support 2.

In this embodiment, the support 2 of the computer data back-up tape 1 has a thickness of 6.0 to 6.5 μm, preferably 6.1 to 6.3 μm. On the one surface of the support 2, the undercoat layer 3 having a thickness of 0.5 to 2.5 μm and the magnetic recording layer 4 having a thickness of 0.05 to 0.5 μm are formed and on the other surface of the support 2, the back coat layer 5 having a thickness of 0.4 to 0.7 μm is formed.

The computer data back-up tape 1 shown in FIG. 1 is manufactured by forming the undercoat layer 3 and the magnetic recording layer 4 on one surface of a broad support 2 using a coating process or the like, forming the back coat layer 5 on the other surface of the broad support 2 using a coating process or the like, to form a broad magnetic tape (not shown), and cutting the broad magnetic tape in the longitudinal direction thereof so that each computer data back-up tape 1 has a predetermined width.

Figure 2:
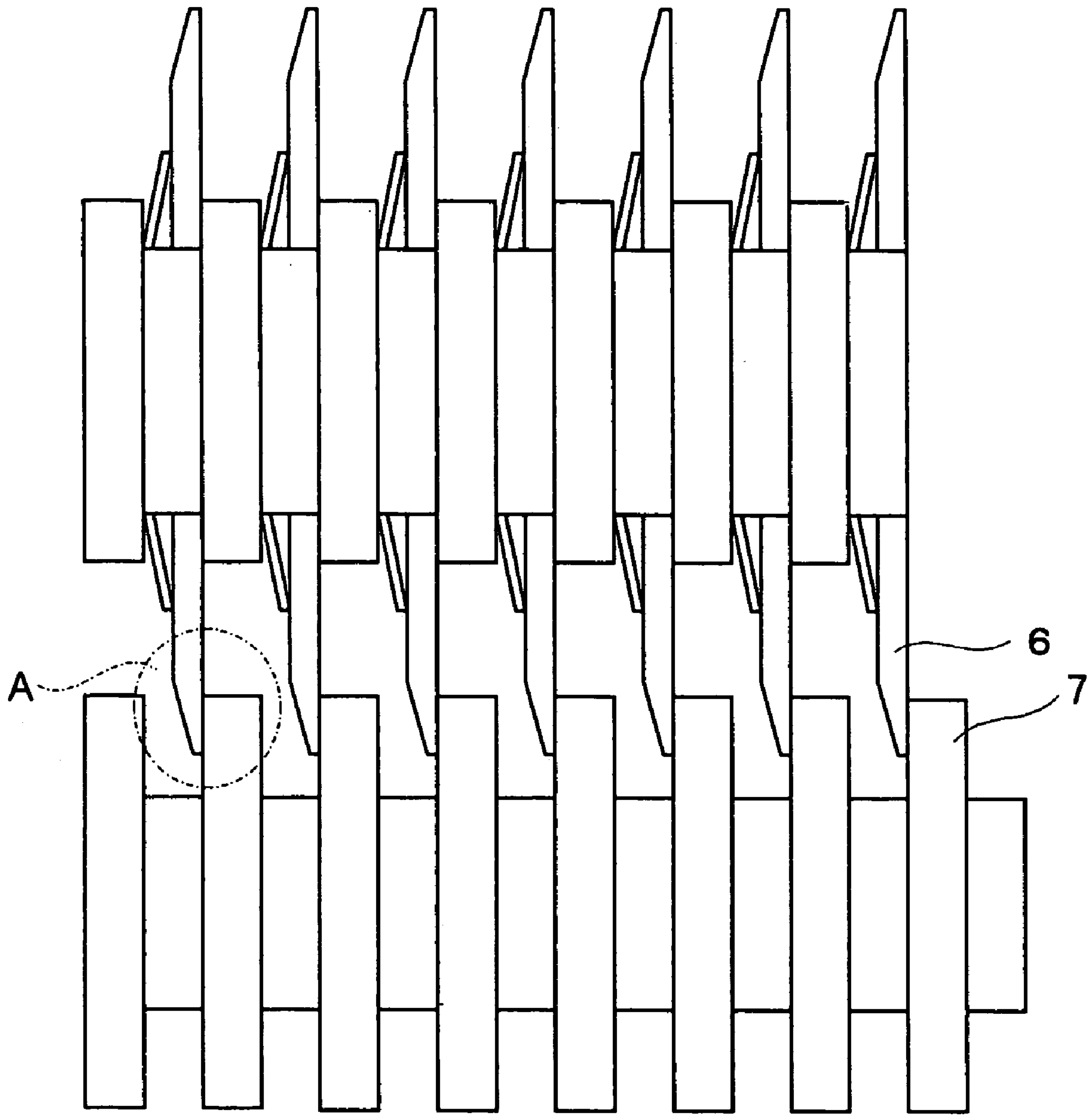
FIG. 2 is a schematic lateral cross-sectional view showing a magnetic tape cutting device that is a preferred embodiment of the present invention.
Figure 3:
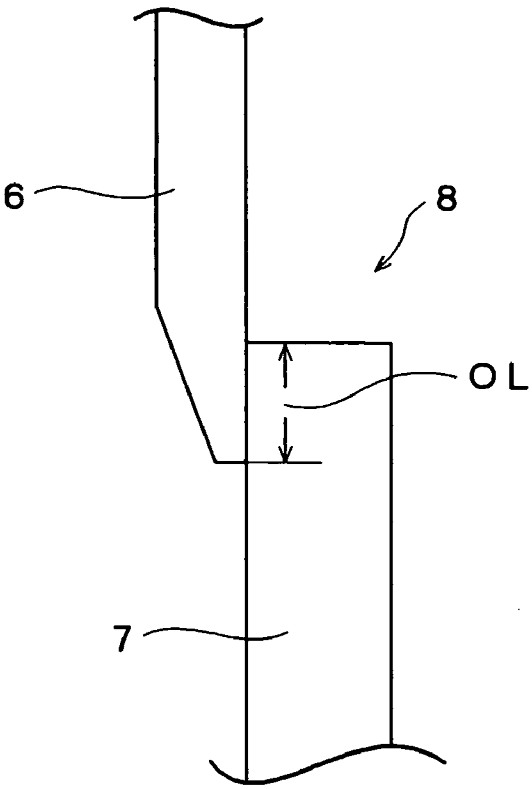
FIG. 3 is a schematic enlarged partial cross-sectional view of a portion indicated by A in FIG. 2.

FIG. 2 is a schematic lateral cross-sectional view showing a magnetic tape cutting device that is a preferred embodiment of the present invention and FIG. 3 is a schematic enlarged partial cross-sectional view of a portion indicated by A in FIG. 2.

As shown in FIG. 2, a magnetic tape cutting device according to this embodiment is constituted so as to cut a broad magnetic tape (not shown) including a support 2 having a thickness of about 6.2 μm, an undercoat layer 3 having a thickness of about 2 μm and a magnetic recording layer 4 having a thickness of about 0.15 μm formed on one surface of the support 2, and a back coat layer 5 having a thickness of about 0.5 μm formed on the other surface of the support 2 into magnetic tapes each having a predetermined width, thereby manufacturing a computer data back-up tape 1 and includes a plurality of cutting units 8 each provided with a disk-like upper blade 6 and a disk-like lower blade 7 which are constituted to be rotatable.

In FIG. 3, OL designates the length of a region where the upper blade 6 and the lower blade 7 overlap.

As shown in FIG. 3, in this embodiment, as the upper blade 6, there is used a blade whose surface facing the lower blade 7 is substantially parallel with the surface of the lower blade 7 facing the upper blade 6 and whose surface opposite from the surface facing the lower blade 7 is an inclined surface formed so that the thickness of the upper blade 6 gradually decreases toward its tip end portion.

Figure 4:
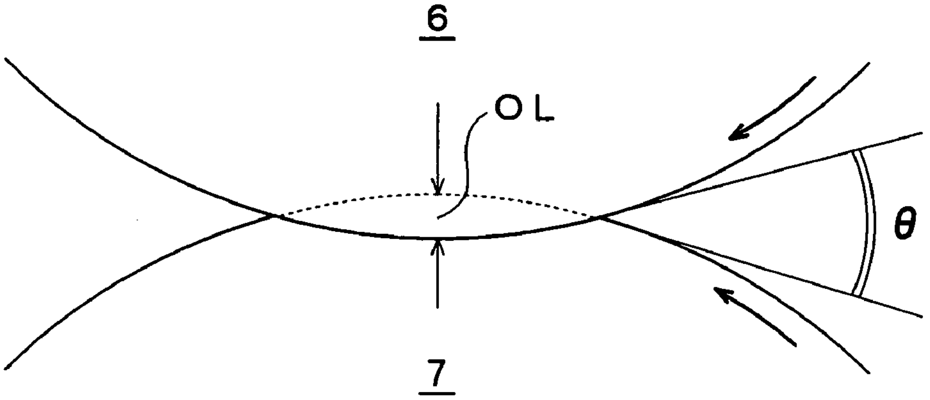
FIG. 4 is a longitudinal cross-sectional view showing one of the cutting units constituting the magnetic tape cutting device shown in FIG. 1.

FIG. 4 is a longitudinal cross-sectional view showing one of the cutting units 8 constituting the magnetic tape cutting device shown in FIG. 1.

As shown in FIG. 4, in each of the cutting units 8 constituting the magnetic tape cutting device according to this embodiment, the disk-like upper blade 6 and the disk-like lower blade 7 are rotated in opposite directions to each other and the broad magnetic tape is fed to a portion between the disk-like upper blade 6 and the disk-like lower blade 7 in such a manner that the magnetic layer 4 is located on the side of the upper blade 6 and the back coat layer 5 is located on the side of the lower-blade 7, whereby the broad magnetic tape is cut by the upper blade 6 and the lower blade 7 of neighboring cutting units 8 constituting the magnetic tape cutting device into magnetic tapes each having a predetermined width, thereby manufacturing a computer data back-up tape 1.

In this embodiment, the angle θ (hereinafter referred to as "cutting start angle") between the disk-like upper blade 6 and the disk-like lower blade 7 at the time that cutting of the broad magnetic tape fed to a portion between the upper blade 6 and the lower blade 7 by the upper blade 6 and the lower blade 7 is started is set to be equal to or larger than 9 degrees and smaller than 12 degrees.

The cutting start angle between the upper blade 6 and the lower blade 7 can be set by adjusting the length OL of the region where the upper blade 6 and the lower blade 7 overlap.

Figure 5:
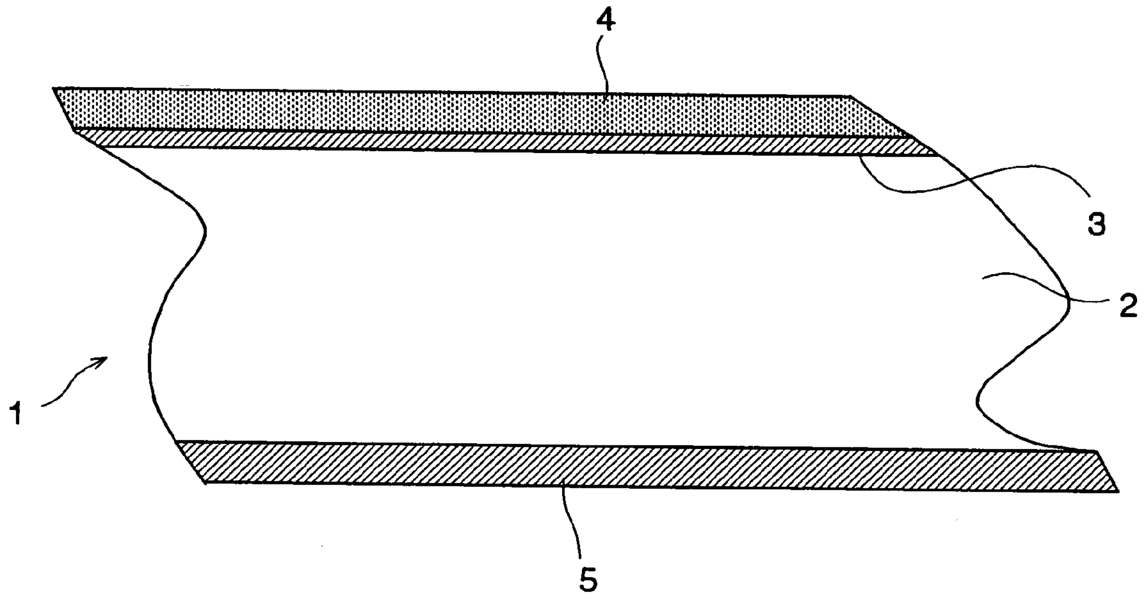
FIG. 5 is a schematic lateral cross-sectional view showing a computer data back-up tape produced by cutting a broad magnetic tape into magnetic tapes each having a predetermined width.

FIG. 5 is a schematic lateral cross-sectional view showing the computer data back-up tape 1 produced by cutting the broad magnetic tape into magnetic tapes each having a predetermined width.

As shown in FIG. 5, the cut surface of the computer data back-up tape 1 produced by cutting the broad magnetic tape into magnetic tapes each having a predetermined width on the side of the upper blade 6 has an irregular raised and depressed pattern and usually has a projected portion close to the surface of the magnetic recording layer 4. On the other hand, the cut surface of the computer data back-up tape 1 on the side of the lower blade 7 usually has a projected portion close to the back coat layer 5.

When data are to be recorded in the magnetic recording layer 4 of the computer data back-up tape 1, the computer data back-up tape 1 is fed in the data recording apparatus, while both side surfaces, namely, both cut surfaces of the computer data back-up tape 1, are guided by guide members of the data recording apparatus. On the other hand, when data recorded in the magnetic recording layer 4 of the computer data back-up tape 1 are to reproduced, the computer data back-up tape 1 is fed in the data recording apparatus with both cut surfaces of the computer data back-up tape 1 guided by guide members of the data reproducing apparatus.

Therefore, in the case where the degree of the projection of the cut surface exceeds a predetermined level, the guide members of the data recording apparatus or the data reproducing apparatus come into contact with the projected portions of the cut surfaces of the computer data back-up tape 1 when data are to be recorded or when data are to be reproduced, whereby there arises a risk of the projected portions of the cut surfaces dropping off the computer data back-up tape 1.

Figure 6:
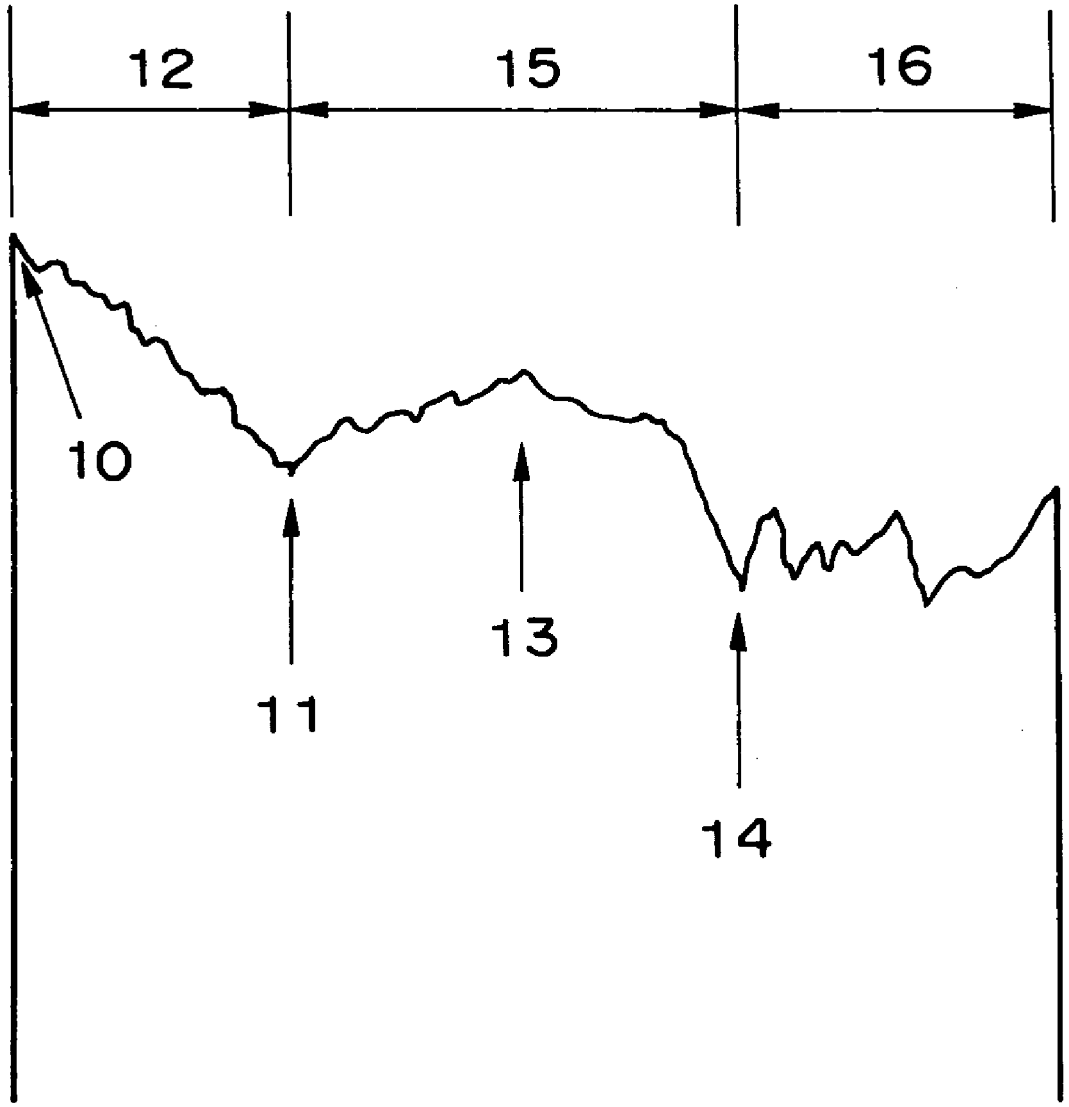
FIG. 6 is a diagram schematically showing one example of a profile of a cut surface of a computer data back-up tape on the side of a lower blade.

FIG. 6 is a diagram schematically showing one example of the profile of the cut surface of the computer data back-up tape 1 on the side of the lower blade 7.

As shown in FIG. 6, on the cut surface on the side of the lower blade 7 of the computer data back-up tape 1 produced by cutting the broad magnetic tape into magnetic tapes each having a predetermined width, a first projected portion 10 is formed in the back coat layer 5 or in the vicinity thereof and a first concave portion 11 is formed between the first projected portion and the substantially center portion of the computer data back-up tape 1 in the thickness direction thereof A region between the back coat layer 5 and the first concave portion 11 is a first sheared region 12 where the computer data back-up tape 1 is sheared by a shearing force applied thereto from the disk-like upper blade 6 and the disk-like lower blade 7 of the cutting unit 8, and as shown in FIG. 6, an irregular and large raised and depressed pattern is formed in the first sheared region 12.

As shown in FIG. 6, on the cut surface of the computer data back-up tape 1 on the side of the lower blade 7, a second projected portion 13 is further formed in the vicinity of the substantially center portion of the computer data back-up tape 1 in the thickness direction thereof and a second concave portion 14 is formed between the second projected portion 13 and the magnetic recording layer 4.

A region located between the first concave projected portion 11 and the second concave portion 14 and including the second projected portion 13 is a broken region 15 where the computer data back-up tape 1 is broken by the disk-like upper blade 6 and the disk-like lower blade 7 of the cutting unit 8 and as shown in FIG. 6, an irregular raised and depressed pattern formed in the broken region is smaller than that in the first sheared region 12.

As shown in FIG. 6, on the cut surface of the computer data back-up tape 1 on the side of the lower blade 7, a second sheared region 16 is formed between the second concave portion 14 and the magnetic recording layer 4 by the computer data back-up 1 by a shearing force applied thereto from the disk-like upper blade 6 and the disk-like lower blade 7 of the cutting unit 8. As shown in FIG. 6, as in the case of the first sheared region 12, an irregular and large raised and depressed pattern is formed in the second sheared region 16.

Therefore, if the broad magnetic tape is cut so that the ratio of the broken region 15 included in the cut surface of the computer data back-up tape 1 on the side of the lower blade 7 is increased, it is possible to decrease the irregular raised and depressed pattern formed on the cut surface of the computer data back-up tape 1 on the side of the lower blade 7. Accordingly, if the broad magnetic tape is cut so that the ratio of the broken region 15 included in the cut surface of the computer data back-up tape 1 on the side of the lower blade 7 becomes equal to or larger than a predetermined value, it is possible to prevent the projected portions of the cut surfaces from dropping off the computer data back-up tape 1 when data are to be recorded or when data are to be reproduced, even if the guide members of the data recording apparatus or the data reproducing apparatus come into contact with the projected portions of the cut surfaces of the computer data back-up tape 1 on the side of the lower blade 7.

However, in a study done by the inventors of the present invention, it was found that, irrespective of the diameter of the disk-like upper blade 6, the diameter of the disk-like lower blade 7 and the length OL of the region where the disk-like upper blade 6 and the disk-like lower blade 7 overlap, the ratio of the broken region 15 included in the cut surface of the computer data back-up tape 1 on the side of the lower blade 7 depended upon the cutting start angle θ between the disk-like upper blade 6 and the disk-like lower blade 7 and that it was therefore possible to control the irregular raised and depressed pattern of the cut surface of the computer data back-up tape 1 on the side of the lower blade 7 in a desired manner by adjusting the length OL of the region where the disk-like upper blade 6 and the disk-like lower blade 7 overlap, thereby controlling the cutting start angle θ between the disk-like upper blade 6 and the disk-like lower blade 7. Further, in a study done by the inventors of the present invention, it was found that it was possible to control the irregular raised and depressed pattern of the cut surface of the computer data back-up tape 1 on the side of the lower blade 7 to within an acceptable range by adjusting the cutting start angle θ between the disk-like upper blade 6 and the disk-like lower blade 7 so that the ratio of the broken region 15 included in the cut surface of the computer data back-up tape 1 on the side of the lower blade 7 became 40% to 65%.

In this embodiment, the cutting start angle θ between the disk-like upper blade 6 and the disk-like lower blade 7 is set to be equal to or larger than 9 degrees and smaller than 12 degrees, and it was found that in the case where a broad magnetic tape was cut using the disk-like upper blade 6 and the disk-like lower blade 7 with the cutting start angle θ between the disk-like upper blade 6 and the disk-like lower blade 7 set to be equal to or larger than 9 degrees and smaller than 12 degrees, thereby manufacturing a computer data back-up tape 1, the ratio of the broken region 15 included in the cut surface of the computer data back-up tape 1 on the side of the lower blade 7 became 50% to 60% and it was possible to control the irregular raised and depress pattern of the cut surface of the computer data back-up tape 1 on the side of the lower blade 7 to a smaller value. Therefore, in this embodiment, when data are to be recorded or when data are to be reproduced, even if the guide members of the data recording apparatus or the data reproducing apparatus come into contact with the projected portions of the cut surfaces of the computer data back-up tape 1 on the side of the lower blade 7, it is possible to effectively prevent the projected portions of the cut surfaces on the side of the lower blade 7 from peeling and dropping off the cut surfaces on the side of the lower blade 7 of the computer data back-up tape 1.

In a further study done by the inventors of the present invention, it was found that although the irregular raised and depressed pattern of the cut surface of the computer data back-up tape 1 on the side of the upper blade 6 increased and the degree of the projection of the cut surface of the computer data back-up tape 1 on the side of the upper blade 6 increased as the cutting start angle θ between the disk-like upper blade 6 and the disk-like lower blade 7 increased, it was nevertheless possible in the case where the cutting start angle θ between the disk-like upper blade 6 and the disk-like lower blade 7 was smaller than 12 degrees to effectively prevent the projected portions of the cut surfaces on the side of the upper blade 6 from peeling and dropping off the cutting surface on the side of the upper blade 6 of the computer data back-up tape 1 when data were to be recorded or when data were to be reproduced, even if the guide members of the data recording apparatus or the data reproducing apparatus come into contact with the projected portions of the cut surfaces of the computer data back-up tape 1 on the side of the upper blade 6, because the irregular raised and depressed pattern of the cut surface of the computer data back-up tape 1 on the side of the upper blade 6 was small.

Therefore, in this embodiment, since the cutting start angle θ between the disk-like upper blade 6 and the disk-like lower blade 7 is set to be equal to or larger than 9 degrees and smaller than 12 degrees and the ratio of the broken region 15 included in the lower blade side cut surface of the computer data back-up tape 1 manufactured by cutting the broad magnetic tape using the disk-like upper blade 6 and the disk-like lower blade 7, it is possible to decrease the irregular raised and depressed pattern of the cut surface of the computer data back-up tape 1 on the side of the lower blade 7 and the irregular raised and depressed pattern of the cut surface of the computer data back-up tape 1 on the side of the upper blade 6. Accordingly, when data are to be recorded or when data are to be reproduced, even if the guide members of the data recording apparatus or the data reproducing apparatus come into contact with the projected portions of the cut surfaces of the computer data back-up tape 1 on the side of the lower blade 7 or the projected portions of the cut surfaces of the computer data back-up tape 1 on the side of the upper blade 6, it is possible to effectively prevent the projected portions of the cut surfaces on the side of the lower blade 7 or the projected portions of the cut surfaces on the side of the upper blade 6 from peeling and dropping off the cutting surface on the side of the lower blade 7 or the upper blade 6 of the computer data back-up tape 1.

WORKING EXAMPLES

Hereinafter, working examples will be set out in order to further clarify the advantages of the present invention.

Working Example 1

A broad magnetic tape was manufactured by forming an under coat layer 3 having a thickness of 2 μm and a magnetic recording layer 4 having a thickness of 0.15 μm on one surface of a broad support 2 made of polyethylene naphthalate and having a width of 500 mm and a thickness of 6.1 μm and forming a back coat layer 5 having a thickness of 0.5 μm on the other surface of the support 2, thereby manufacturing a broad magnetic tape.

Then, the broad magnetic tape was cut using a pair of cutting units 8 each including an upper blade 6 having a diameter of 150 mm and a lower blade 7 having a diameter of 150 mm, thereby manufacturing a computer data back-up tape 1 having a width of 12.65 mm.

An upper blade 6 was employed whose surface facing the lower blade 7 was substantially parallel with the surface of the lower blade 7 facing the upper blade 6 and whose surface opposite from the surface facing the lower blade 7 was an inclined surface formed so that the thickness of the upper blade 6 gradually decreased toward its tip end portion, and the length OL of the region where the upper blade 6 and the lower blade 7 of the pair of cutting units overlapped was varied to vary the cutting start angle θ between the upper blade 6 and the lower blade 7. Then, in each case, both cut surfaces of the computer data back-up tape 1 manufactured by cutting the broad magnetic tape were observed.

As shown in FIG. 6, on the cut surface of the computer data back-up tape 1 on the side of the lower blade 7, a first projected portion 10 was formed in the back coat layer 3 and in the vicinity thereof and a first concave portion 11 was formed between the first projected portion and the substantially center portion of the computer data back-up tape 1 in a thickness direction thereof A region between the back coat layer 3 and the first concave portion 11 was a first sheared region 12 where the computer data back-up tape 1 was sheared by a shearing force applied thereto from the disk-like upper blade 6 and the disk-like lower blade 7 of the cutting unit 8 and an irregular and large raised and depressed pattern was formed in the first sheared region 12.

As shown in FIG. 6, on the cut surface of the computer data back-up tape 1 on the side of the lower blade 7, a second projected portion 13 was further formed in the vicinity of the substantially center portion of the computer data back-up tape 1 in the thickness direction thereof and a second concave portion 14 was formed between the second projected portion 13 and the magnetic recording layer 4. A region between the first concave portion 11 and the second concave portion 14 and including the second projected portion 13 was a broken region 15 where the computer data back-up tape 1 was broken by the disk-like upper blade 6 and the disk-like lower blade 7 of the cutting unit 8 and an irregular raised and depressed pattern formed in the broken region was smaller than that in the first sheared region 12.

As shown in FIG. 6, on the cut surface of the computer data back-up tape 1 on the side of the lower blade 7, a second sheared rigion 16 was formed between the second concave portion 14 and the magnetc recording layer 4 by the computer data back-up tape 1 sheared by a shearing force applied thereto from the disk-like upper blade 6 and the disk-like lower blade 7 of the cutting unit 8 thereto, similarly to in the case of the first sheared rigion 12, an irregular and large raised and deprssed pattern was formed in the second sheared region 16.

Table 1 shows ratios of the first sheared region 12, the broken region 15 and the second sheared region 16 in the lower blade side cut surface of the lower blade 7 of each of the computer data back-up tapes 1 manufactured by varying the length of the region where the upper blade 6 and the lower blade 7 of the pair of the cutting units 8 overlap to vary the cutting start angle θ between the upper blade 6 and the lower blade 7 and cutting the broad magnetic tape.

TABLE 1

| cutting start angle (°) | first sheared region 12 (%) | broken region 15 (%) | second sheared region 16 (%) |
|---|---|---|---|
| 5.91 | 42.06 | 36.52 | 21.42 |
| 7.23 | 41.50 | 46.32 | 12.18 |
| 7.29 | 41.67 | 40.17 | 18.16 |
| 8.35 | 36.74 | 47.63 | 15.63 |
| 9.34 | 32.18 | 54.13 | 13.68 |
| 10.23 | 28.86 | 59.46 | 11.68 |
| 11.45 | 24.52 | 58.99 | 16.50 |
| 13.21 | 23.22 | 66.57 | 10.21 |
| 14.46 | 19.95 | 65.17 | 14.89 |

As shown in Table 1, it was found that when the cutting start angle θ between the upper blade 6 and the lower blade 7 was varied, the ratios of the first sheared region 12, the broken region 15 and the second sheared region 16 in the cut surface of the computer data back-up tape 1 on the side of the lower blade 7 varied and as a result, the irregular raised and depressed pattern of the cut surface of the computer data back-up tape 1 on the side of the lower blade 7 varied.

Thus, when the cutting start angle θ between the upper blade 6 and the lower blade 7 was varied, the broad magnetic tape was cut, and both cut surfaces of the thus obtained computer data back-up tape 1 were observed, it was found that in the case where the ratio of the broken region 15 included in the cut surface of the computer data back-up tape 1 on the side of the lower blade 7 was 40% to 65%, it was possible to suppress the irregular raised and depressed pattern of the cut surface of the computer data back-up tape 1 on the side of the lower blade 7 to within an acceptable range. It was further found that, in particular, in the case where the ratio of the broken region 15 included in the cut surface of the computer data back-up tape 1 on the side of the lower blade 7 was 50% to 60%, it was possible to manufacture a computer data back-up tape 1 whose irregular raised and depressed patterns of the cut surfaces on both sides of the lower blade 7 and the upper blade 6 were sufficiently small.

Working Example 2

A broad magnetic tape was manufactured by forming an under coat layer 3 having a thickness of 2 μm and a magnetic recording layer 4 having a thickness of 0.15 μm on one surface of a broad support 2 made of polyethylene terephthalate and having a width of 500 mm and a thickness of 6.1 μm and forming a back coat layer 5 having a thickness of 0.5 μm on the other surface of the support 2. The thus obtained broad magnetic tape was cut using a pair of cutting units 8 each including an upper blade 6 having a diameter of 100 mm and a lower blade having a diameter of 100 mm, thereby manufacturing a computer data back-up tape 1.

An upper blade 6 was employed whose surface facing the lower blade 7 was substantially parallel with the surface of the lower blade 7 facing the upper blade 6 and whose surface opposite from the surface facing the lower blade 7 was an inclined surface formed so that the thickness of the upper blade 6 gradually decreased toward its tip end portion, and the length OL of the region where the upper blade 6 and the lower blade 7 of the pair of cutting units overlapped was varied to vary a cutting start angle θ between the upper blade 6 and the lower blade 7. Then, in each case, both cut surfaces of the computer data back-up tape 1 manufactured by cutting the broad magnetic tape were observed.

As a result, similarly to the case where the broad magnetic tape was cut using the upper blade 6 having a diameter of 150 mm and the lower blade having a diameter of 150 mm to manufacture a computer data back-up tape 1, in the case where the broad magnetic tape was cut using the upper blade 6 having a diameter of 100 mm and the lower blade having a diameter of 100 mm to manufacture a computer data back-up tape 1, it was also found that when the ratio of the broken region 15 included in the cut surface of the computer data back-up tape 1 on the side of the lower blade 7 was 40% to 65%, it was possible to suppress the irregular raised and depressed pattern of the cut surface of the computer data back-up tape 1 on the side of the lower blade 7 to within an acceptable range and that when the ratio of the broken region 15 included in the cut surface of the computer data back-up tape 1 on the side of the lower blade 7 was 50% to 60%, it was possible to manufacture a computer data back-up tape 1 whose irregular raised and depressed patterns of the cut surfaces on both sides of the lower blade 7 and the upper blade 6 were sufficiently small.

Thus, it was found that if the cutting start angle θ between the upper blade 6 and the lower blade 7 is set in such a manner that the cut surface on the lower blade 7 to be formed by cutting a broad magnetic tape includes 40% to 65% of a region formed by breaking the broad magnetic tape and the broad magnetic tape is cut to manufacture a computer data back-up tape 1, it is possible to prevent projected portions of the cut surfaces of the computer data back-up tape 1 from peeling and dropping off the cut surfaces of the computer data back-up tape 1 when data are to be recorded or when data are to be reproduced.

Further, it was found that if the cutting start angle θ between the upper blade 6 and the lower blade 7 is set in such a manner that the cut surface on the lower blade 7 to be formed by cutting a broad magnetic tape includes 50% to 60% of a region formed by breaking the broad magnetic tape and the broad magnetic tape is cut to manufacture a computer data back-up tape 1, it is possible to reliably prevent projected portions of the cut surfaces of the computer data back-up tape 1 from peeling and dropping off the cut surfaces of the computer data back-up tape 1 when data are to be recorded or when data are to be reproduced.

The present invention has thus been shown and described with reference to specific embodiments and working examples. However, it should be noted that the present invention is in no way limited to the details of the described arrangements but changes and modifications may be made without departing from the scope of the appended claims.

For example, although the above described embodiments were explained with respect to the case of cutting a broad magnetic tape and manufacturing a computer data back-up tape 1, the present invention is not limited to the case of cutting a broad magnetic tape and manufacturing a computer data back-up tape 1 and can be widely applied to cases of cutting a broad magnetic tape and manufacturing a magnetic tape for audio recording, a magnetic tape for video recording, an 8 mm magnetic tape for video recording and the like. Further, the present invention is applicable to not only a magnetic tape having a single magnetic recording layer 4 but also a magnetic tape having a plurality of magnetic recording layer 4.

Further, in the above described embodiments and Working Examples, a broad magnetic tape cut using an upper blade 6 whose surface facing a lower blade 7 is substantially parallel with a surface of the lower blade 7 facing the upper blade 6 and whose surface opposite from the surface facing the lower blade 7 is an inclined surface formed so that the thickness of the upper blade 6 gradually decreases toward its tip end portion, thereby manufacturing a computer data back-up tape 1. However, it is not absolutely necessary to cut a broad magnetic tape using an upper blade 6 whose surface facing a lower blade 7 is substantially parallel with a surface of the lower blade 7 facing the upper blade 6 and whose surface opposite from the surface facing the lower blade 7 is an inclined surface formed so that the thickness of the upper blade 6 gradually decreases toward its tip end portion and a broad magnetic tape may instead be cut using an upper blade 6 whose surface facing a lower blade 7 is chamfered at a predetermined angle to the surface of the lower blade 7 facing the upper blade 6 and whose surface opposite from the surface facing the lower blade 7 is an inclined surface formed so that the thickness of the upper blade 6 gradually decreases toward its tip end portion, thereby manufacturing a computer data back-up tape 1.

According to the present invention, it is possible to provide a magnetic tape and a method for manufacturing a magnetic tape which can minimize an irregular raised and depressed pattern of a cut surface of a magnetic tape obtained by feeding a broad magnetic tape to a portion between a disk-like upper blade and a disk-like lower blade overlapping each other and rotating in the opposite directions and cutting it along the longitudinal direction thereof and effectively prevent a part of the cut surface of the magnetic tape from peeling off and dropping from the cut surface of the magnetic tape owing to the irregular raised and depressed pattern of the cut surface of the magnetic tape when data are to be recorded in the magnetic tape or data are to be reproduced from the magnetic tape.

The invention claimed is:

1. A magnetic tape manufactured by feeding a broad magnetic tape including a broad support formed with a magnetic recording layer on one side thereof and a back coat layer on the other surface thereof to a portion between a disk-like upper blade and a disk-like lower blade overlapping each other and rotating in opposite directions to each other and cutting it into magnetic tapes each having a predetermined width, a cut surface of the magnetic tape on the side of the lower blade including a broken region formed by cutting the magnetic tape by a breaking force, wherein the cut surface of the magnetic tape on the side of the lower blade further includes a first sheared region having a first irregular raised and depressed pattern and a second sheared region having a second irregular raised and depressed pattern, the first sheared region and the second sheared region formed by cutting the magnetic tape by a shearing force;

wherein the magnetic tape further comprises a cut surface on the side of the upper blade, the cut surface on the side of the upper blade including an irregular raised and depressed pattern; and wherein the irregular raised and depressed pattern of the cut surface on the side of the upper blade and the first and second irregular raised and depressed patterns of the cut surface on the side of the lower blade are reduced when the broken region of the cut surface on the side of the lower blade is 50% to 60% of the cut surface on the side of the lower blade.

2. The magnetic tape of claim 1, wherein the first sheared region is adjacent to the back coat layer.

3. The magnetic tape of claim 1, wherein the second sheared region is adjacent to the magnetic recording layer.

4. The magnetic tape of claim 1, wherein a thickness of the broad support is 6.1 μm.

5. The magnetic tape of claim 1, wherein a thickness of the magnetic recording layer is 0.15 μm.

6. The magnetic tape of claim 1, wherein a thickness of the back coat layer is 0.5 μm.

7. The magnetic tape of claim 1, wherein a width of the magnetic tape is 12.65 mm.

8. A magnetic tape cut from a broad magnetic tape by application of a breaking force and a shearing force to the broad magnetic tape, the magnetic tape comprising:

a support having a first surface and a second surface;

a magnetic recording layer formed on the first surface of the support;

a back coat layer formed on the second surface of the support; and a first cut surface oriented substantially along a thickness of the magnetic tape, the first cut surface including a first sheared region adjacent to the back coat layer, a second sheared region adjacent to the magnetic recording layer, and a broken region between the first sheared region and the second sheared region, the broken region formed by application of the breaking force to the broad magnetic tape, the broken region occupying 50% to 60% of the first cut surface.

9. The magnetic tape of claim 8, wherein the first sheared region includes an ilTegular raised and depressed pattern.

10. The magnetic tape of claim 9, wherein the broken region occupies 50% to 60% of the First cut surface to suppress the irregular raised and depressed pattern of the first sheared region.

11. The magnetic tape of claim 8, further comprising a second cut surface oriented substantially along the thickness of the magnetic tape, the second cut surface having an irregular raised and depressed pattern.

12. The magnetic tape of claim 11, wherein the broken region suppresses the irregular raised and depressed pattern of the second cut surface.

13. The magnetic tape of claim 8, wherein the support has a thickness of 6.1 μm.

14. The magnetic tape of claim 8, wherein the magnetic recording layer has a thickness of 0.15 μm.

15. The magnetic tape of claim 8, wherein the back coat layer has a thickness of 0.15 μm.

16. The magnetic tape of claim 8, further comprising an undercoat layer formed between the magnetic recording layer and the support.

17. The magnetic tape of claim 16, wherein the undercoat layer has a thickness of 2.0 μm.

* * * * *

UNITED STATES PATENT AND TRADEMARK OFFICE

CERTIFICATE OF CORRECTION

PATENT NO. : 7,267,895 B2

APPLICATION NO. : 10/790313
DATED : September 11, 2007
INVENTOR(S) : Sadayuki Shoudai et al.

It is certified that error appears in the above-identified patent and that said Letters Patent is hereby corrected as shown below:

Column 16
Line 51, "has a thickness of 0.15 μm." is incorrect should read as -- has a thickness of 0.5 μm. --.

Signed and Sealed this

Fifteenth Day of July, 2008

JON W. DUDAS
*Director of the United States Patent and Trademark Office*